US00RE42727E

(19) United States
(12) Reissued Patent
Kang

(10) Patent Number: US RE42,727 E
(45) Date of Reissued Patent: Sep. 20, 2011

(54) METHOD FOR QUICKLY BOOTING A COMPUTER SYSTEM

(75) Inventor: Seong-Cheol Kang, Kyunggi-Do (KR)

(73) Assignee: Operating Systems Solutions, LLC, Miami, FL (US)

(21) Appl. No.: 11/961,567

(22) Filed: Dec. 20, 2007

Related U.S. Patent Documents

Reissue of:
(64) Patent No.: 6,434,696
Issued: Aug. 13, 2002
Appl. No.: 09/309,275
Filed: May 11, 1999

U.S. Applications:
(63) Continuation of application No. 10/918,293, filed on Aug. 12, 2004, now Pat. No. Re. 40,092.

(30) Foreign Application Priority Data

May 11, 1998 (KR) ..... 98-17715

(51) Int. Cl.
*G06F 9/455* (2006.01)

(52) U.S. Cl. ..... 713/2; 713/1

(58) Field of Classification Search ..... 713/1, 2
See application file for complete search history.

(56) References Cited

U.S. PATENT DOCUMENTS 4,885,770 A 12/1989 Croll
4,959,774 A 9/1990 Davis
5,155,833 A 10/1992 Cullison et al.
5,269,019 A 12/1993 Peterson et al.
5,269,022 A 12/1993 Shinjo et al.
5,276,890 A 1/1994 Arai
5,392,415 A 2/1995 Badovinatz et al.
5,513,359 A 4/1996 Clark et al.
5,564,054 A 10/1996 Brannick et al.
5,710,930 A 1/1998 Laney et al.
5,745,669 A 4/1998 Hugard et al.
5,784,628 A 7/1998 Reneris et al.
5,870,613 A 2/1999 White et al.
5,925,129 A 7/1999 Comb et al.
(Continued)

OTHER PUBLICATIONS

"Fast DOS Soft Boot" IBM Technical Disclosure Bulletin, Feb. 1, 1997, vol. 37, Issue 2B, pp. 185-186.

*Primary Examiner* — Chun Cao
(74) *Attorney, Agent, or Firm* — Carlineo, Spicer & Kee, LLC

(57) ABSTRACT

A method for quickly booting a personal computer system using boot configuration information on memory and the attached devices that was created and saved in a hard disk at the preceding boot process. The method for a quick boot process includes the steps of performing a power-on self test POST) operation when a personal computer system is powered on or a reset button is pressed; performing a normal boot process after the POST operation; saving the contents of memory and the status of the attached devices to a hard disk; checking if a reboot is requested; restoring the saved boot configuration information from the hard disk, after POST is completed during the reboot process; checking whether or not an initial device configuration file and/or an automatic batch file were changed; and executing commands in the two files and saving a newly created boot configuration information to the hard disk for future boot. The personal computer system, may reboot quickly because of omission of execution of the initial device configuration filed and the automatic batch file.

6 Claims, 6 Drawing Sheets

U.S. PATENT DOCUMENTS 5,978,913 A 11/1999 Broyles et al.
6,073,232 A 6/2000 Kroeker et al.
6,098,158 A 8/2000 Lay et al.
6,173,417 B1 1/2001 Merrill
6,209,088 B1 3/2001 Reneris et al.
6,279,109 B1 8/2001 Brundridge
6,374,353 B1 4/2002 Settsu et al.
6,401,198 B1 6/2002 Harmer et al.
6,529,966 B1 3/2003 Williams et al.
6,567,774 B1 5/2003 Lee et al.
6,609,182 B1 8/2003 Pedrizetti et al.
RE40,092 E * 2/2008 Kang ..... 713/2

* cited by examiner

METHOD FOR QUICKLY BOOTING A COMPUTER SYSTEM

Matter enclosed in heavy brackets [ ] appears in the original patent but forms no part of this reissue specification; matter printed in italics indicates the additions made by reissue.

*CROSS-REFERENCE TO RELATED APPLICATIONS*

*NOTICE: More than one reissue application has been filed for the reissue of U.S. Pat. No. 6,434,696, filed May 11, 1999. The reissue applications are U.S. patent application Ser. No. 11/961,567 (the present application), filed Dec. 20, 2007, which is a continuation reissue of Ser. No. 10/918,293, filed Aug. 12, 2004 (now U.S. Reissued Pat. No. RE40,092), both of which are reissues of U.S. Pat. No. 6,434,696.*

BACKGROUND OF THE INVENTION

1. Field of the Invention

The present invention relates to a method of and apparatus for booting a personal computer system and, more particularly, for quickly booting a computer system, in which a boot configuration information is created and saved in a disk for future boot, and the saved boot configuration information is reused upon the request of the subsequent boot.

2. Description of the Related Art

FIG. 1 shows a block diagram of the system architecture for a conventional personal computer system, comprising a central processing unit (CPU) 1; a read only memory (ROM) 2 for permanent storage of basic input output system (BIOS) and the initial states of internal devices, a random access memory (RAM) 3 for temporary storage of information; a micro computer (MICOM) 4 for controlling peripheral devices such as a keyboard input device, a mouse input device, and a power supply 7; a hard disk (HDD) 8 for providing a secondary information storage; a disk controller 5 for controlling HDD; a video output display 6 for displaying information; and a power supply 7. When power is applied to the computer system, the computer system starts to be booted to load an operating system (OS) and thus is brought into a known useful state in which application programs can be executed. This procedure is generally called "booting". An operating system is a software that provides resource management on a computer system, including basic tasks such as process execution, memory management, and file management. Examples are MS-DOS, Windows95, OS/2, and UNIX. Execution of user applications is based on these basic functions of the operating system.

The boot process of an IBM PC in which MS-DOS operating system is already installed is as follows. When a user turns the personal computer power switch on or presses a reset button, a power-on self test (POST) is performed by ROM BIOS codes to diagnose each component of the personal computer. Next, a file called MSDOS.SYS is loaded and executed, and another file called IO.SYS is then loaded and executed to perform certain preliminary functions related to management of such peripheral devices as keyboard, disk, and display. And then, a command preprocessor or COMMAND.COM is loaded into a memory that receives, interprets and executes user commands. A file called CONFIG.SYS that specifies devices possibly connected to the personal computer is loaded and ASCII statements contained therein are executed to load device drivers and initialize them.

Finally, another ASCII file called AUTOEXEC.BAT is loaded and then programs that are listed therein are executed, thereby preparing the personal computer for use.

There two kinds of boots; "cold boots" and "warm boots", which rely on the state of the computer system when the boot operation is requested. A "cold boot" is performed when power is applied to the computer or a reset button is pressed. When an operating system is loaded in memory already and the computer system is powered on already, a user may request a "warm boot" by entering a predefined sequence of key strokes, e.g., <Ctrl>+<Alt>+<Del>. The BIOS codes include a plurality of computer routines for controlling devices such as a system clock, video output display 6, disk controller 5, and keyboard and thus provide a low-level interface to these devices. The BIOS is generally stored in a Flash ROM.

Shortly after power on or a reset button is pressed, the CPU begins executing the ROM BIOS codes. The BIOS codes for POST are, first, executed to diagnose and initialize devices attached to the computer system and obtain the status of the devices.

When a "warm boot" is requested or a reset button is pressed, it is desirable that the time required for the boot process is reduced to force the computer into a ready state as quickly as possible. The boot process is usually called "quick boot", which is achieved by simplifying some device diagnosis processes or loading the device status information that was obtained at the preceding boot time from a storage medium such as disk. Because the quick boot means a boot process in which some POST operations, e.g., memory test are skipped, the quick boot is generally referred to as "quick post".

FIG. 2 is a flowchart of the quick POST in an IBM personal computer system in which Windows95 is installed according to the conventional art. When the computer system is powered on or a reset button is pressed (S11), the Windows95 is loaded into a memory after execution of a normal POST process (S12). To be specific, once the POST process is performed, ASCII statements in CONFIG.SYS and AUTOEXEC.BAT are executed sequentially and WIN.COM is then executed to load Windows95. While Windows 3.1, a previous version of Windows95, is loaded after the personal computer is booted on the basis of MS-DOS, Windows95 installed PC is booted and Windows95 user interface is provided directly.

Once the boot operation is completed, a basic boot information is saved to a disk for future quick POST process (S13). After that, if a user requests a "quick boot" to reboot the personal computer (S14), the above-mentioned quick POST process is performed to reduce the time needed to complete a normal POST process. As another method, the POST process execution is skipped by using a basic boot information that was created and saved in a disk immediately after the preceding POST process is completed.

However, the conventional quick boot relies on the POST process, e.g., the omission of memory test. In other words, in the conventional quick booting method, the same operations as those of normal boot process are still performed after the quick POST process. Therefore, in case where there are a lot of ASCII statements in CONFIG.SYS and AUTOEXEC.BAT, the quick boot of the conventional art is not effective to reduction of the boot time.

According to the conventional booting method, in Windows95 installed personal computer system, working environment or all information stored in memory are saved to a disk for the subsequent quick boot. If memory size is larger than 32 MB, the amount of data to be saved to the disk becomes too large. As a result, the subsequent booting by reloading the saved data into the memory may be even slower than a normal boot.

SUMMARY OF THE INVENTION

It is therefore a primary object of the present invention to provide a method and apparatus that significantly reduces the time required for boot process after a POST operation by using a boot configuration information on memory and the attached devices that were created and saved in a disk in the preceding boot process, and thereby skipping execution of statements in an initial device configuration file and an automatic batch file.

To achieve the object, the present invention provides a method for quickly booting a personal computer system, comprising the steps of performing a POST operation when the system is powered on or a reset button is pressed; checking if a boot configuration information that was created in the preceding boot process exists in a disk; saving the boot configuration information to the disk after execution of a POST operation on the basis of the checking result; and loading a graphic user interface (GUI) program.

The method for quickly booting a computer system according to the present invention is also characterized in that it comprises the steps of performing a POST operation when the system is powered on or a reset button is pressed; restoring a boot configuration information by using the boot configuration information that has been saved in a disk; and loading a GUI program.

According to the quick booting method of the present invention, after ASCII statements listed in an initial device configuration file and an automatic batch file are executed, a boot configuration information that is resident in a memory, i.e., the status of devices and the contents of memory are saved into a disk. After that, when a reboot is requested, a computer system can be booted quickly by using the stored boot configuration information, without execution of the initial device configuration file and the automatic batch run file.

BRIEF DESCRIPTION OF THE DRAWINGS

The accompanying drawings, which are included to provide a further understanding of the invention, illustrate the preferred embodiment of this invention, and together with the description, serve to explain the principles of the present invention.

In the drawings.

DETAILED DESCRIPTION OF THE PREFERRED EMBODIMENT

The preferred embodiments of the present invention will be described below in detail referring to the accompanying drawings.

Figure 1:
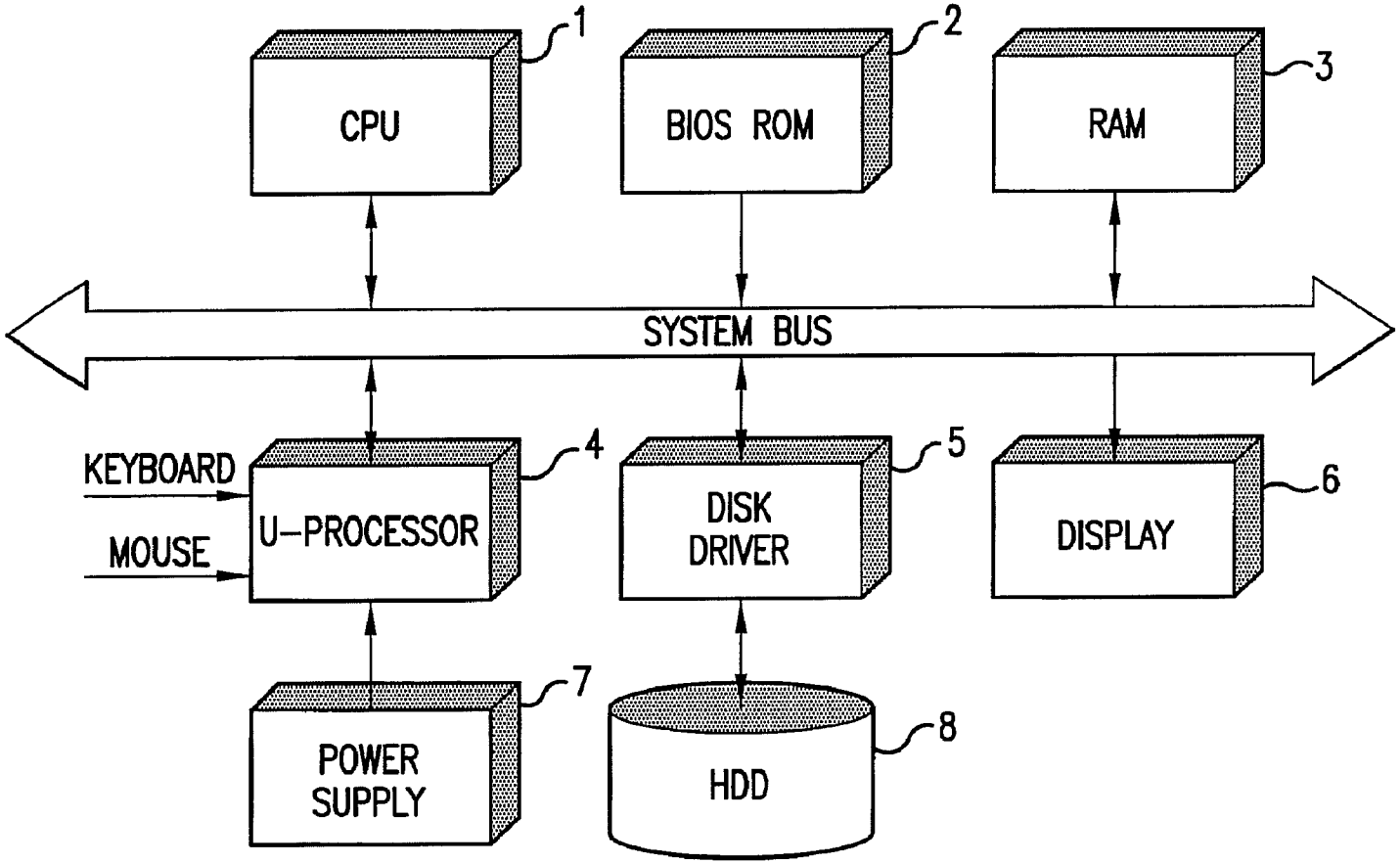
FIG.1 CONVENTIONAL ART
FIG. 1 is the system architecture of a general personal computer system.
Figure 2:
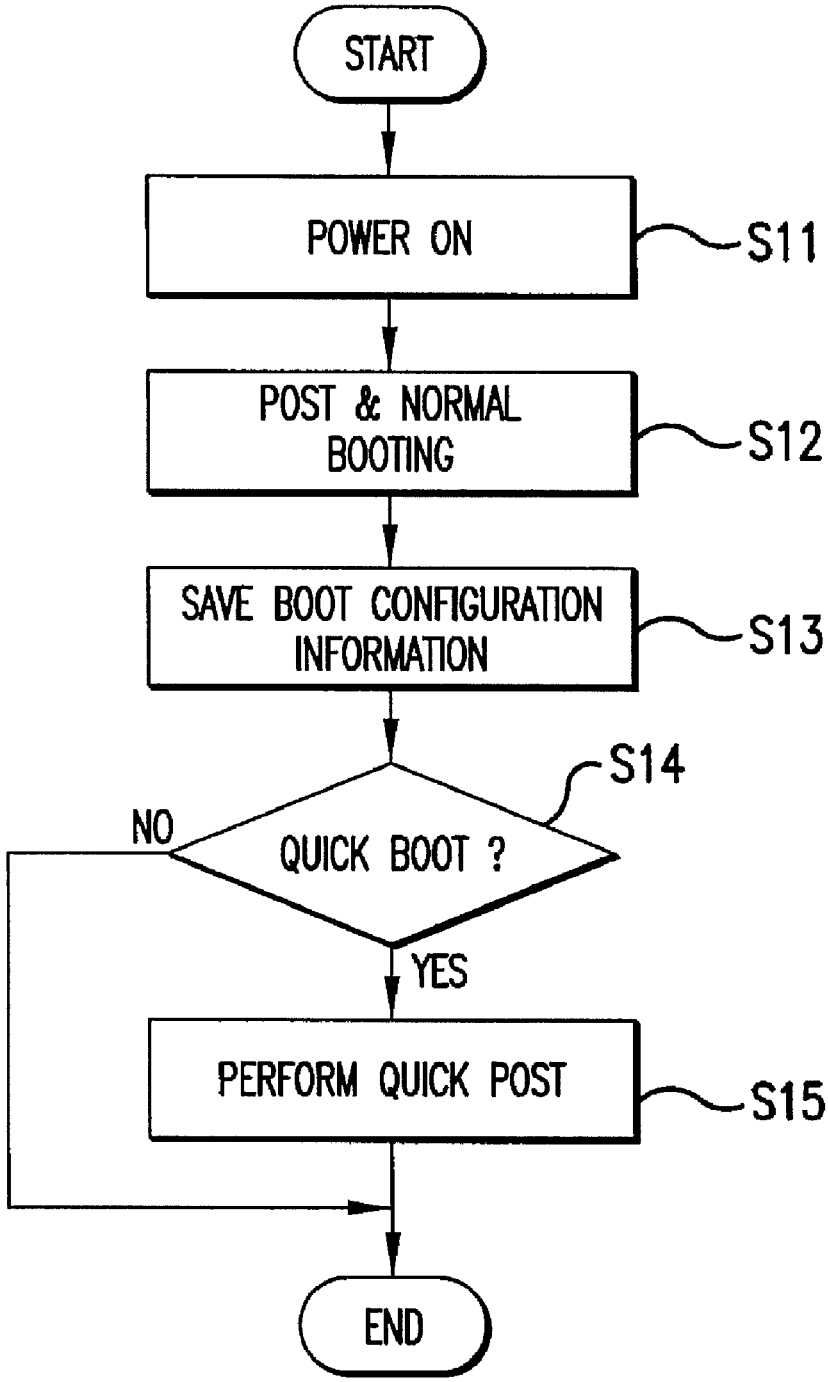
FIG.2 CONVENTIONAL ART
FIG. 2 is a flowchart showing the conventional method for quick POST operation in a Windows95-installed personal computer.
Figure 3:
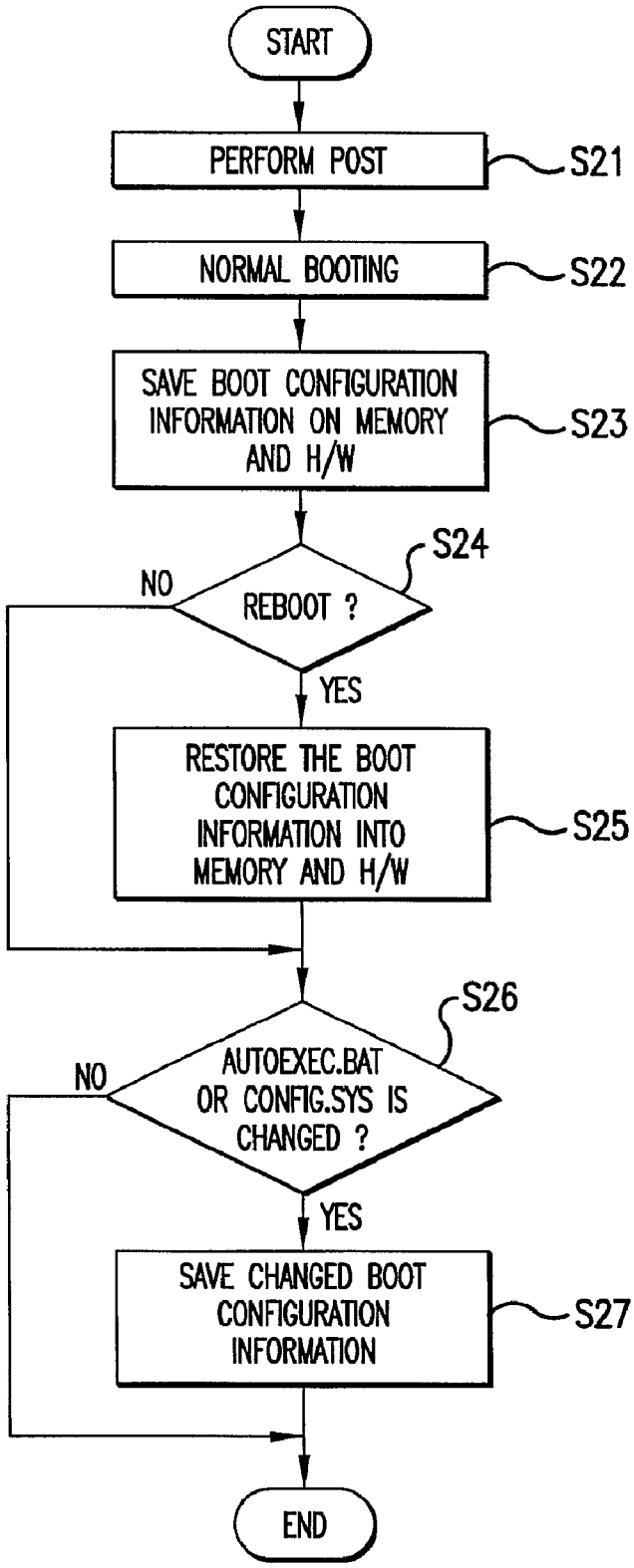
FIG. 3 is a flowchart showing a method for a quick boot according to an embodiment of the present invention.

FIG. 3 is a flowchart of the quick boot process in an IBM personal computer system according to an embodiment of the present invention. The flow proceeds to step S21, in which a POST operation is performed when a computer system is powered on or a reset button is pressed. A normal boot process of an operating system, e.g., Windows95 is then executed (S22). Next, a boot configuration information, i.e., the contents of memory and the status of the attached devices that was created and has been resident in a memory since execution of the POST operation is saved to a disk (523). A RAM-resident program is called by a software interrupt (INT in general) in modified ROM BIOS codes so as to save the boot configuration information into a disk for future boots. Since then, when a reboot is requested (S24), the POST operation is performed and then the saved boot configuration information is retrieved from the disk in order to complete the reboot process (S25). If it is determined that either CONFIG.SYS or AUTOEXEC.BAT was changed (S26), the changed two files are loaded into a memory and are then executed to form a new boot configuration information, which will be saved to the disk again for the subsequent boot. In this way, if CONFIG.SYS and AUTOEXEC.BAT are not changed, they do not need to be loaded and executed when a computer system is booted, resulting in a quick boot.

Figure 4:
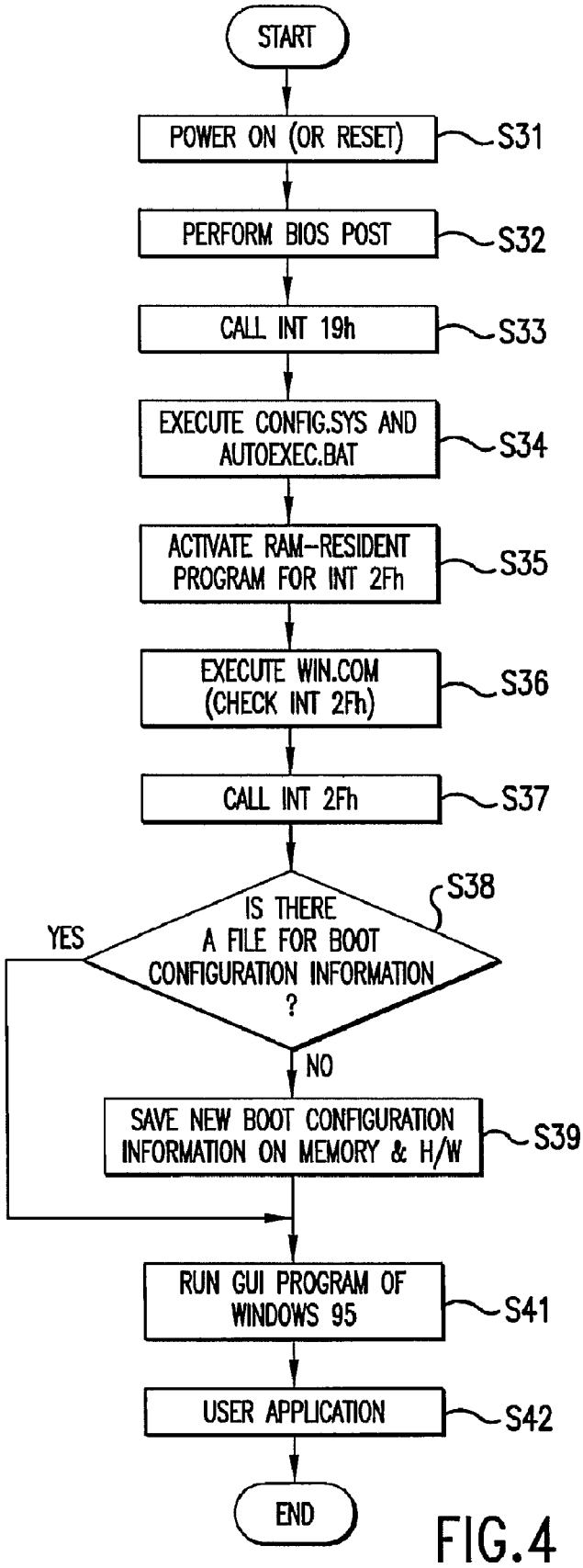
FIG. 4 is a flowchart showing a method for saving a boot configuration information after execution of POST operation in a Windows95-installed personal computer according to an embodiment of the present invention.
Figure 5:
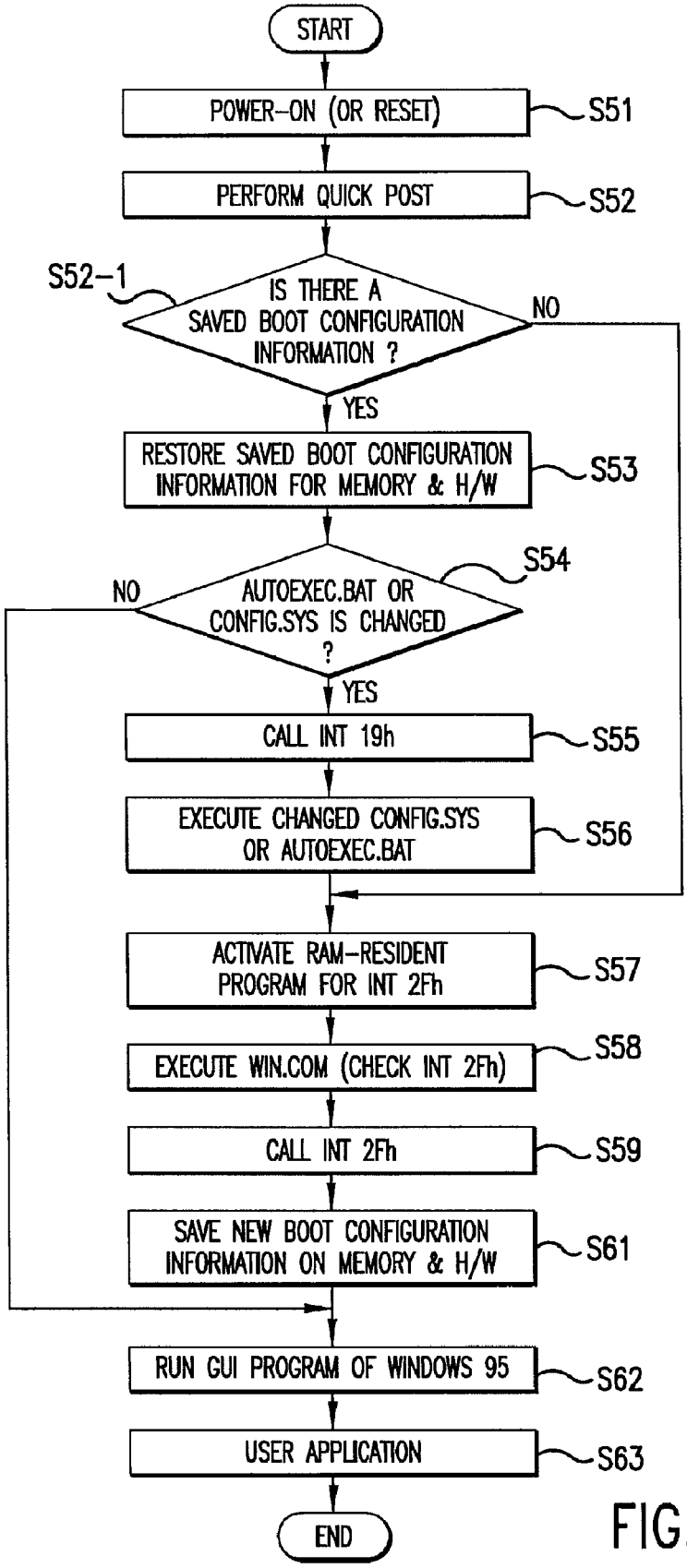
FIG. 5 is a flowchart showing a method for restoring a stored boot configuration information in a Windows95-installed personal computer according to an embodiment of the present invention.

FIGS. 4 and 5 are flowcharts respectively showing methods for saving and restoring a boot configuration information in a Windows95-installed IBM personal computer according to an embodiment of the present invention.

The method for saving the boot configuration information to a disk will be described now in detail referring to FIG. 4. When power is turned on or a reset button is pressed (S31), a cold boot or warm boot is requested. The POST operation is, first, executed (S32) and then an INT 19h service routine is called to load an operating system (S33). By calling the INT 19h, control is passed to a bootstrap loader which loads the operating system into a memory to prepare the personal computer for use.

Next, CONFIG.SYS is loaded into the memory and statements therein are executed. CONFIG.SYS includes ASCII statements describing the size of disk buffer, the number of files that can be opened simultaneously, the names of device drivers needed to control devices attached to the computer system, and so on. After executing CONFIG.SYS, another ASCII file called AUTOEXEC.BAT is loaded into the memory. The file-names of programs that a user wants to run automatically at the boot time are listed therein, and the programs are executed (S34).

Next, a RAM-resident program is activated to replace an original INT 2Fh service routine in the ROM BIOS codes. To do this, the interrupt Vector for INT 2Fh is substituted for the address of the RAM-resident program (S35). Next, WIN.COM is executed to load Windows95 into the memory (S36). The INT 2Fh service routine is called by using software system management interrupt (software SMI) during the execution of WIN.COM. At the interrupt point, the contents of a particular register is sent to the RAM-resident program and then performs a prescribed function associated with the register contents (S37).

If the register contents is a predetermined value, e.g., 1605H, the RAM-resident program checks if there is a file that contains the boot configuration information in a disk (S38) and saves the current boot configuration information to the disk, if not (S39). WIN.COM is then executed to load a GUI program of Windows95 into the memory (S41), providing a user with Windows95 interface (S42). It should be noted that the boot configuration information is saved to the disk immediately before Windows95 loads device drivers into a memory, i.e., an extended memory is used to load GUI program of Windows95.

Figure 6:
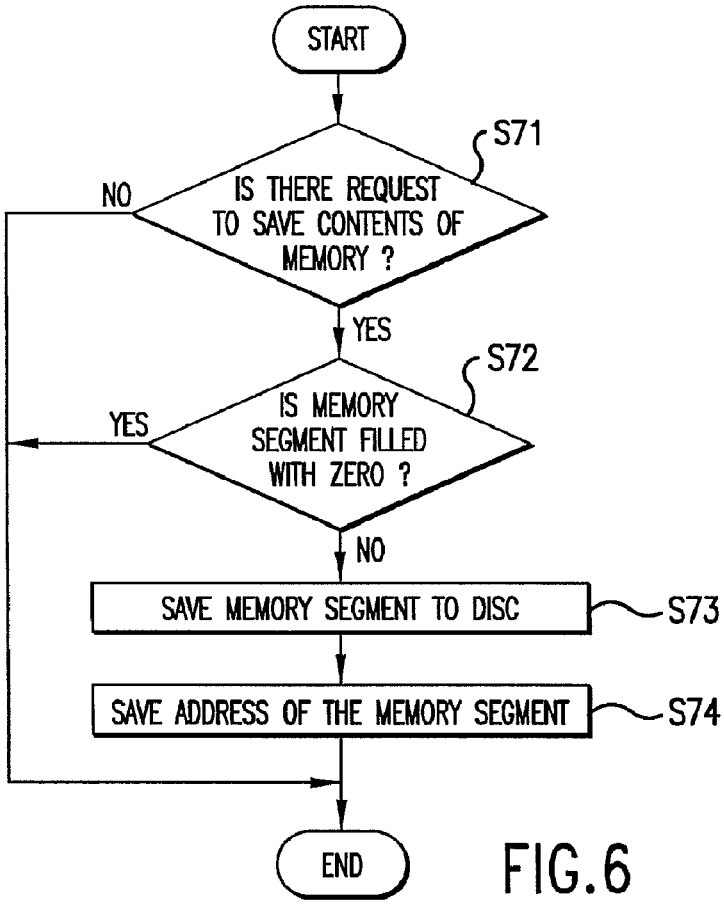
FIG. 6 is a flowchart showing a method for saving the contents of memory into a disk according to an embodiment of the present invention.

The operation of saving the boot configuration information to a disk (the step S39 of FIG. 4) is described in detail with reference to a flowchart of FIG. 6. The contents of memory block of a predetermined size are, first, examined and are then saved to the disk if the memory block is satisfied with a predetermined criterion. An address of the memory block is saved to the disk, as well. To be specific, if it is determined that the boot configuration information resident in a memory needs to be saved to the disk (S71), the INT 2Fh service routine checks if a memory segment of 64 KB is filled with '0', while scanning every memory segment (S72). If not, the contents of the memory segment are saved to the disk (S73), together with its address (S74). The memory segment is treated as a memory accessing unit, which is 64 KB in size in the IBM personal computer system. And the boot configuration information to be saved is approximately 7 MB in size, which is composed of 1 MB for saving the software SMI, 4 MB for the video memory, and 2 MB for saving a memory area in which the interrupt vector table and some crucial programs for system management are resided.

The next time the computer system is powered on or reset, the saved boot configuration information is used to boot the computer system. The method for restoring the boot configuration information will be described now in detail referring to FIG. 5.

Once power is turned on or reset button is pressed (S51), a quick POST operation including skip of memory test is executed (S52), and then it is checked whether or not there is any boot configuration information that has been saved to a disk in the preceding boot process (S52-1). If it is determined that a boot configuration information exists, the operation for its restoration is performed (S53).

Figure 7:
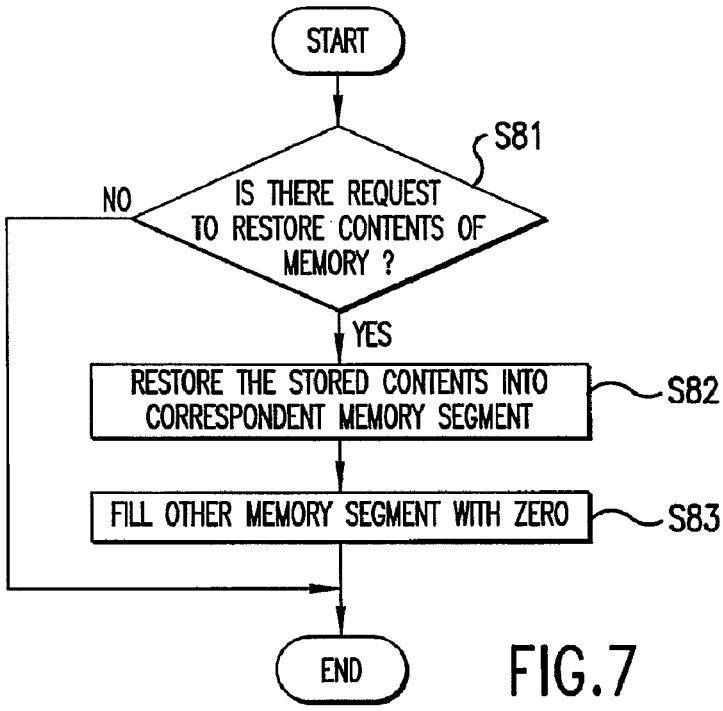
FIG. 7 is a flowchart showing a method for restoring the contents of memory according to an embodiment of the present invention.

The process for restoring the boot configuration information is described in detail referring to a flowchart of FIG. 7. First, it is checked whether or not a current boot configuration has been changed based on the restored boot configuration information. If there is any change in the boot configuration, commands that are usually executed at the boot time, for example, commands for initial setup device configuration are executed and then a newly formed boot configuration information is saved to the disk for future boot. Specifically, when a computer system is resumed, it is checked if the boot configuration information will be restored (S81). If it is determined that the boot configuration information is restored, the contents of memory segments, addresses of which was saved before in the disk, are copied to the memory at their own addresses (S82). Other memory segments than the restored memory segments, become filled with '0' (S83). The reason why the contents of those segments are not restored is that they are set to all '0's during the BIOS POST operation.

Once restoration of the contents of those memory segments is completed, it is checked if CONFIG.SYS and AUTOEXEC.BAT was changed (S54). If it is determined that either CONFIG.SYS and AUTOEXEC.BAT was changed, the bootstrap loader, the INT 19h service routine is called (S55), and then the both ASCII files are loaded into a memory to execute statements therein (S56). Next, the RAM-resident program is activated to replace the original INT 2Fh service routine (S57).

Next, WIN.COM is executed to load Windows95 into the memory (S58). The INT 2Fh service routine is called through the software SMI during the execution of WIN.COM (S59) and thus the RAM-resident program is executed. The RAM-resident program, first, checks the contents of a particular register and then, if it is matched with a predetermined value, saves the current boot configuration information that is resident in the memory to the disk (S61). The method for saving the contents of memory where the boot configuration information is resided is the same as that shown in FIG. 6. Next, control is passed to WIN.COM again and thus Windows95 GUI is set up (S62), thereby preparing the computer system for use (S63).

The reason why the boot configuration information should be restored before Windows95 loads Windows95-dedicated device drivers is to reduce the amount of data on the disk that must be copied to a memory at the boot time. Because the extended memory has been not used yet at that time, even if the size of total memory is 512 MB, memory of about 7 MB only is saved to and restored from the disk, according to the methods shown in FIGS. 6 and 7. Therefore, the execution of CONFIG.SYS and AUTOEXEC.BAT can be skipped by restoring the contents of memory and the status of devices based on the boot configuration information, thereby reducing the boot time significantly.

Though the description hereinbefore may refer to terms commonly used in describing particular computer systems and software, such as IBM personal computer and Windows95 operation system, the concepts equally apply to other systems and software.

The foregoing is provided only for the purpose of illustration and explanation of the preferred embodiments of the present invention, so changes, variations and modifications may be made without departing from the spirit and scope of the invention.

What is claimed is:

[1. A method for fast booting a computer system, comprising the steps of:

A. performing a power on self test (POST) of basic input output system (BIOS) when the system is powered on or reset is requested;

B. checking whether a boot configuration information including a system booting state which was created while executing a previous normal booting process exists or not;

C. storing the boot configuration information from execution of the POST operation before loading a graphic interface (GUI) program, based on the checking result; and D. loading the graphic user interface (GUI) program.]

[2. A method according to claim 1, wherein said step C stores the boot configuration information into a disk storage medium.]

[3. A method according to claim 1, wherein said step C stores the boot configuration information after execution of the POST operation is completed and before an extended memory becomes in use.]

[4. A method according to claim 1, wherein said step C comprises the steps of:

checking contents of a memory block of a predetermined size;

storing the contents of the memory block into a disc storage medium based on the checking result; and storing the address of the stored memory block in the disc storage medium.]

[5. A method according to claim 1, wherein the boot configuration information in which system booting state is included comprises states of memory and hardware.]

[6. A method for fast booting a computer system, comprising the steps of:

A. performing a power on self test (POST) of basic input output system (BIOS) when the system is powered on or reset is requested;

B. resuming a boot configuration information including a system booting state by using the boot configuration information which was stored while executing a previous normal boot process; and C. loading a graphic user interface (GUI) program.]

[7. A method according to claim 6, wherein said step B further comprises the steps of:

checking if a designated boot configuration information is different from the resuming boot configuration information;

executing an initial driving program based on a modified configuration information; and updating the boot configuration information after said execution.]

[8. A method according to claim 6, wherein said step B comprises the steps of:

determining whether to resume said stored boot configuration information;

resuming the contents of memory blocks, addresses of which have been stored while executing a previous normal booting process; and writing zeros into other memory blocks than the resumed memory blocks.]

[9. A method according to claim 6, wherein said step B restores said stored boot configuration information before an extended memory becomes in use.]

[10. A method for quickly booting a computer system in which Windows operating system is installed, comprising the steps of:

A. performing a power on self test (POST) of basic input output system (BIOS) when the system is powered on or reset is requested;

B. checking whether a boot configuration information including a system booting state which was created while executing a previous normal boot process exists or not;

C. storing the current boot configuration information, if there is no stored boot configuration information;

D. performing the POST operation when the computer system is rebooted;

E. resuming the stored boot configuration information; and

F. updating the boot configuration information before a graphic user interface (GUI) program is loaded, if a designated boot configuration information is different from the boot configuration information.]

[11. A method according to claim 10, wherein said step B calls an interrupt for bootstrap loader to check if the boot configuration information which was created while executing a previous normal booting process.]

[12. A method according to claim 10, wherein said step F determines whether or not the designated boot configuration information is different from the resumed boot configuration information based on changes of CONFIG.SYS file and/or AUTOEXEC.BAT file.]

[13. A method for supporting fast booting a computer system through storing/resuming a memory status of the system, comprising the steps of:

checking whether to store a memory contents status;

checking memory contents of a certain unit of the memory;

selectively storing contents written in an area necessary for system operation based on the memory contents checking result; and resuming the stored contents for fast booting.]

[14. A method according to claim 13, wherein the certain unit is composed of segment having 64 bytes.]

[15. A method according to claim 13, wherein the storing step stores the contents if a value in a memory block is not '0', and does not store the contents if the value is '0'.]

[16. A method according to claim 13, wherein the storing step stores an address of a memory block if value of a memory block is not '0', and does not store the address if the value is '0'.]

[17. The method according to claim 13, wherein the resuming step resumes pre-stored memory contents of the certain unit while writing '0' in a remainder of the certain unit.]

[18. A method according to claim 13, wherein the resuming step resumes the stored contents belonging to a corresponding segment if the system is resumed from a hibernation state to a normal state, and does not resume a remaining portion of the segment.]

*19. A method for fast booting a computer system, the method comprising:*

*performing a power on self test (POST) of basic input output system (BIOS) when the computer system is powered on or reset is requested;*

*checking whether a boot configuration information created while executing a previous normal booting process exists or not, wherein the boot configuration information comprises selected portions of main memory contents indicative of a status of hardware; and*

*booting a computer based on the boot configuration information in response to the checking after the POST operation.*

*20. The method of claim 19, further comprising:*

*loading a graphic user interface (GUI) program in response to the checking.*

*21. The method of claim 19, wherein the boot configuration information is stored in uncompressed form.*

*22. The method of claim 19, further comprising:*

*restoring the boot configuration information from a disk storage medium.*

*23. The method of claim 22, wherein the restoring restores the boot configuration information before an extended memory becomes in use.*

*24. The method of claim 19, wherein the checking includes checking the boot configuration information on a block-by-block basis.*

* * * * *